United States Patent
Ludtke

(10) Patent No.: US 6,799,205 B2
(45) Date of Patent: Sep. 28, 2004

(54) DISTRIBUTED HELP SYSTEM FOR CONSUMER ELECTRONIC DEVICES

(75) Inventor: Harold Aaron Ludtke, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 10/403,731

(22) Filed: Mar. 31, 2003

(65) Prior Publication Data

US 2003/0191820 A1 Oct. 9, 2003

Related U.S. Application Data

(63) Continuation of application No. 09/239,718, filed on Jan. 29, 1999, now Pat. No. 6,584,496.

(51) Int. Cl.[7] .............................................. G06F 13/00
(52) U.S. Cl. ........................ 709/220; 709/222; 709/217; 345/705
(58) Field of Search ............................... 709/217, 222, 709/221, 220; 707/10, 200; 345/705–715, 717; 434/350

(56) References Cited

U.S. PATENT DOCUMENTS

| | | | | |
|---|---|---|---|---|
| 4,964,077 A | * | 10/1990 | Eisen et al. .................. | 345/707 |
| 5,727,950 A | * | 3/1998 | Cook et al. .................. | 434/350 |
| 5,933,139 A | * | 8/1999 | Feigner et al. .............. | 345/708 |
| 5,982,365 A | * | 11/1999 | Garcia et al. ............... | 345/705 |
| 6,005,569 A | * | 12/1999 | Breggin ....................... | 345/711 |
| 6,091,930 A | * | 7/2000 | Mortimer et al. ........... | 434/362 |
| 6,199,136 B1 | * | 3/2001 | Shteyn ........................ | 710/305 |
| 6,208,338 B1 | * | 3/2001 | Fischer et al. .............. | 345/705 |
| 6,230,197 B1 | * | 5/2001 | Beck et al. .................. | 709/223 |
| 6,236,395 B1 | * | 5/2001 | Sezan et al. ................. | 345/723 |
| 6,236,989 B1 | * | 5/2001 | Mandyam et al. ............. | 707/4 |
| 6,300,950 B1 | * | 10/2001 | Clark et al. ................. | 345/705 |
| 6,505,243 B1 | * | 1/2003 | Lortz .......................... | 709/220 |
| 6,584,496 B1 | * | 6/2003 | Ludtke ........................ | 709/217 |

\* cited by examiner

*Primary Examiner*—Kenneth R. Coulter
(74) *Attorney, Agent, or Firm*—Gregory J. Koerner; Simon & Koerner LLP

(57) ABSTRACT

Methods and systems consistent with the present invention provide help and configuration information for a plurality of consumer electronic devices in an audio/video network. More specifically, each network device provides help information, identifying the device and its features to other network devices. A help utility program interfaces with a presentation device to provide help information to a user. Another implementation consistent with the present invention provides help information related to configuring two or more devices to perform an operation.

10 Claims, 3 Drawing Sheets

DISTRIBUTED HELP SYSTEM FOR CONSUMER ELECTRONIC DEVICES

CROSS-REFERENCE TO RELATED APPLICATIONS

This application relates to, and claims priority in, U.S. patent application Ser. No. 09/239,718, now U.S. Pat. No. 6,584,496, entitled "Distributed Help System For Consumer Electronic Devices," filed on Jan. 29, 1999. The foregoing related application is commonly assigned, and is hereby incorporated by reference.

BACKGROUND SECTION

1. Field of the Invention

The present invention relates generally to consumer electronic devices in a network that share distributed access to resources, and more particularly to providing on-line help and configuration information for consumer electronic devices in an audio/video network.

2. Description of the Background Art

Consumer electronic devices generally have limited resources, including RAM, ROM, display size, etc., to store and display information, including complete operating instructions, to a user. To compensate for the current inability to provide such information to users, printed operating manuals are distributed with consumer electronic devices to educate users on features and guide them through using a device. Although printed manuals can provide useful information, they do not make a device user friendly and they are easily misplaced. Additionally, printed manuals do not assist a user in integrating the use of several consumer electronic devices. Similarly, when a device increases or decreases its functionality, a printed manual is unable to alert a user of the change.

The IEEE-1394 digital interface standard is a serial digital interface enabling high-speed (up to 400 Mbps) data communication among multimedia consumer electronic equipment such as video camcorders, electronic still cameras, and digital audio/visual equipment. Features of IEEE-1394 include live connection/disconnection without data loss or interruption, automatic configuration supporting plug and play, and flexible network topology allowing mixing branches and daisy-chains.

The high-speed data transfer of the 1394 interface has enabled the connection of digital consumer products directly to a personal computer, promising the advent of integrated audio/video networks that may take advantage of distributed resources. For example, consumer electronic devices participating in an audio/video network may share distributed access to a particular feature of one of the network devices. Such flexibility, however, exacerbates the limitations of printed manuals. It is therefore desirable to provide methods and apparatus to increase the availability of operating instructions and other information to make consumer electronic devices more user-friendly.

SUMMARY

Methods and systems consistent with the present invention provide distributed help and configuration information for a plurality of consumer electronic devices in an audio/video network. An embodiment consistent with the present invention, as embodied and broadly described herein, includes an audio/video network of various consumer electronic devices, each device containing information related to its configuration, features, and function.

At least one network device must contain a help system that collects help information for all network devices, and coordinates the presentation of help information in an audio or video text or track, or a combination. The help information may be presented in an interactive or non-interactive form. Any network device containing a presentation device may present the help instructions.

An implementation consistent with the present invention retrieves a help request from a user of a consumer electronic device, accesses help information associated with the device, and presents help instructions addressing the help request. The help information is modifiable according to characteristics associated with the device or other network devices.

BRIEF DESCRIPTION OF THE DRAWINGS

The accompanying drawings, which are incorporated in and constitute a part of this specification, illustrate an implementation consistent with the invention, and together with the description, serve to explain the principles of the invention.

DETAILED DESCRIPTION

Reference will now be made in detail to an implementation consistent with the present invention as illustrated in the accompanying drawings. Wherever possible, the same reference numbers will be used throughout the drawings and the following description to refer to the same or like parts.

As described herein, a help system interfaces with network devices to provide "help" information, that is, operating instructions and related information pertaining to one or more of the devices. When a device becomes connected to the network it gets registered with the help system. A user then initiates operation of the help system. The help information associated with each device is contained in each device within a help information storage module that downloads the help information to the help-system, either when a device enters a network, or upon user activation of the help system. Alternatively, help information associated with a device may be contained in another network device or storage facility. When multiple devices are connected to a network the help system may provide help information related to integrating the use of those devices.

Figure 1:
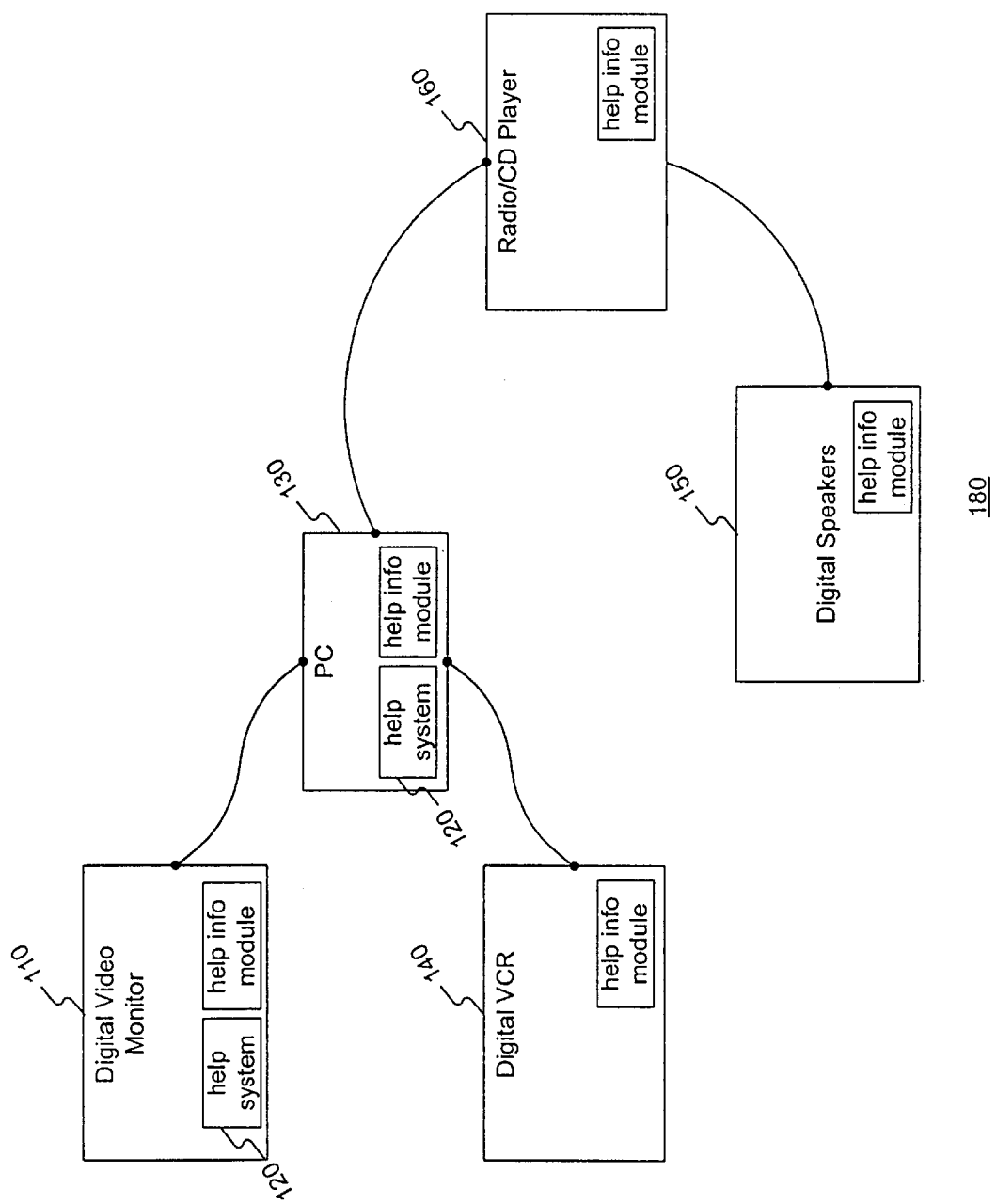
FIG. 1 is a diagram illustrating an exemplary network of devices coupled through an IEEE-1394 interface in a manner consistent with the present invention.

FIG. 1 is a diagram illustrating a network of IEEE-1394 enabled devices consistent with an implementation of the present invention. A Universal Serial Bus ("USB"), or any other interface mechanism, may also be used. As shown, a network 180 includes the following consumer electronic devices: digital video monitor 110, digital VCR 140, personal computer 130, digital speakers 150, radio/CD player 160. The devices communicate digital audio and video data with one another via an IEEE-1394 interface.

Each of the consumer electronic devices in network 180 contains a help information storage module that includes data specifying help information associated with the device. The help information associated with each device includes information identifying the type of device, the device's built-in features, such as an ability to record, and information regarding the device's compatibility with other potential network devices. Each device may also include a reference to another network device, in the form of for example, self describing data ("SDD"). SDD defines a means of embedding a URL in the configuration ROM of a 1394 device. Such a URL could be used to point to an Internet web or ftp site, specifying a file that contains help information for a device. Additional information regarding SDD may be found in the Home Audio/Video Interoperability ("HAVi™") specification, 1.0 beta version, incorporated herein by reference.

HAVi™, which defines a set of on-screen display data structures, may be used to provide access to help information stored internally to a network consumer electronic device. Devices may also exchange information through use of unit and subunit identification descriptors, consistent with the AV/C Digital Interface Command Set General Specification ("AV/C"). Additional information regarding AV/C may be found in the AV/C specification, version 3.0, incorporated herein by reference. One skilled in the art of interactive user interfaces will appreciate that additional data structures (beyond HAVi™ and AV/C) may be used to support the exchange of information among network devices.

Each time a new device becomes connected to a network 180, it gets registered with a help system 120 contained in one or more of devices 110, 130, 140, 150, and 160, described below. When a device is added to or removed from a 1394 network, a bus reset is generated. All devices connected to the bus will see this signal, and will participate in the bus configuration process, allowing all network devices to determine which other devices are present in the network. The help instructions provided to a user reflect relevant characteristics associated with other network devices.

When a device adds a new feature, or deletes an existing one, for example, when a snap-on module is physically attached to or removed from a device, the device notifies help system 120 of the addition or deletion by issuing a command consistent with either the HAVi™ or the AV/C protocol.

Figure 2:
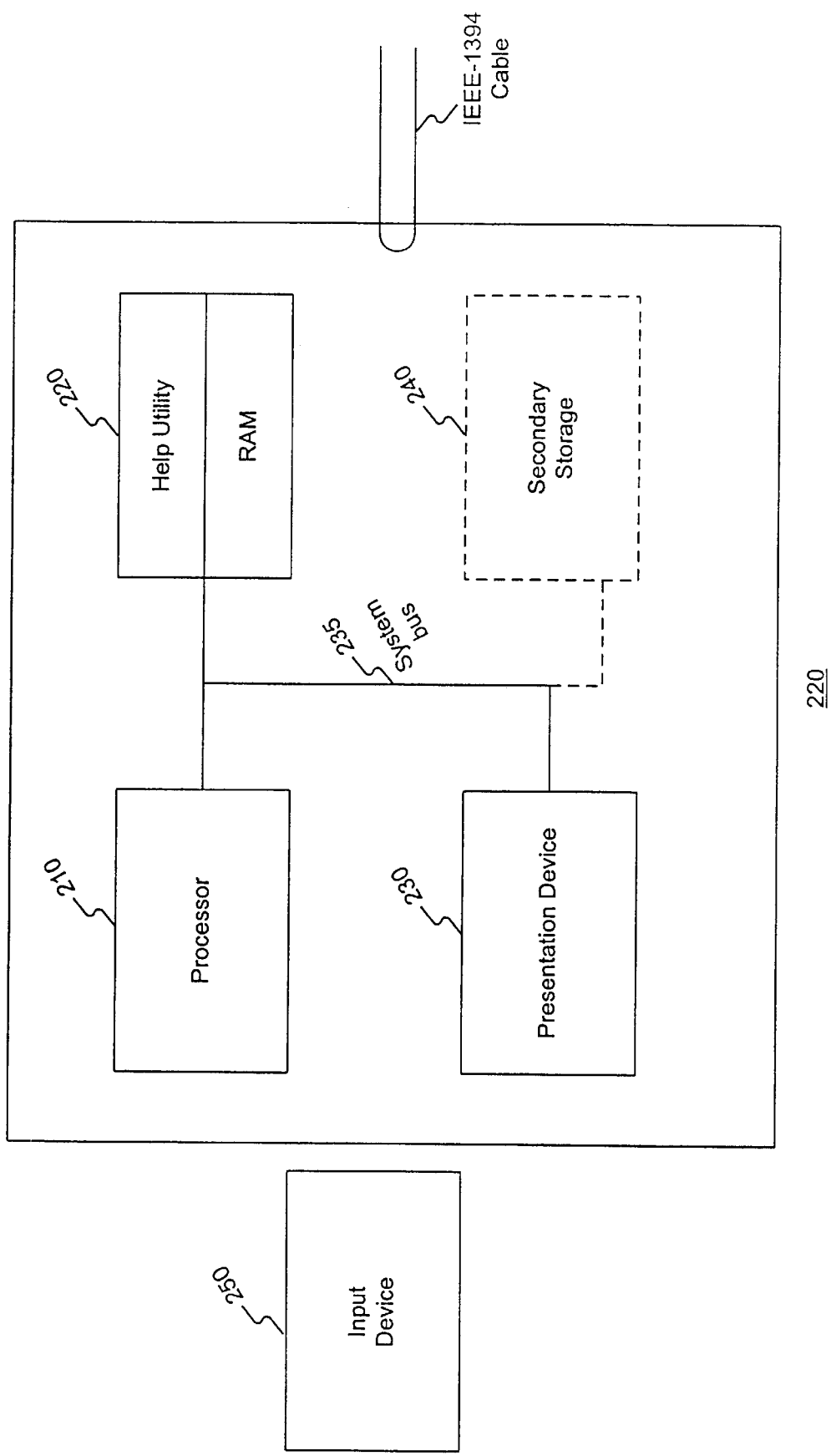
FIG. 2 is a block diagram illustrating a detailed view of a help system consistent with the present invention.

As shown in FIG. 2, help system 120 includes a processor 210, a help utility program 220, a RAM 225, a presentation device 230, an optional secondary storage unit 240, and an input device 250. RAM 225 may consist of a removable memory cartridge, such as the Sony MemoryStick™. The components of help system 120 interact via system bus 235. Presentation device 330 may in general be any presentation mechanism associated with any network device. For example, a set of speakers and a video monitor of a digital television both represent acceptable presentation devices. Input device 250 includes any suitable user input mechanism that allows a user to interact with the help system. Although input device 250 may be a stand-alone device as shown in FIG. 2, it will generally be contained in a consumer electronic device, for example, a keyboard or a touch sensitive on-screen display. The input device may or may not be physically connected to any of the network devices. For example, a remote control input device could communicate with the help system by used of an infrared, RF, or other wireless signal.

Figure 3:
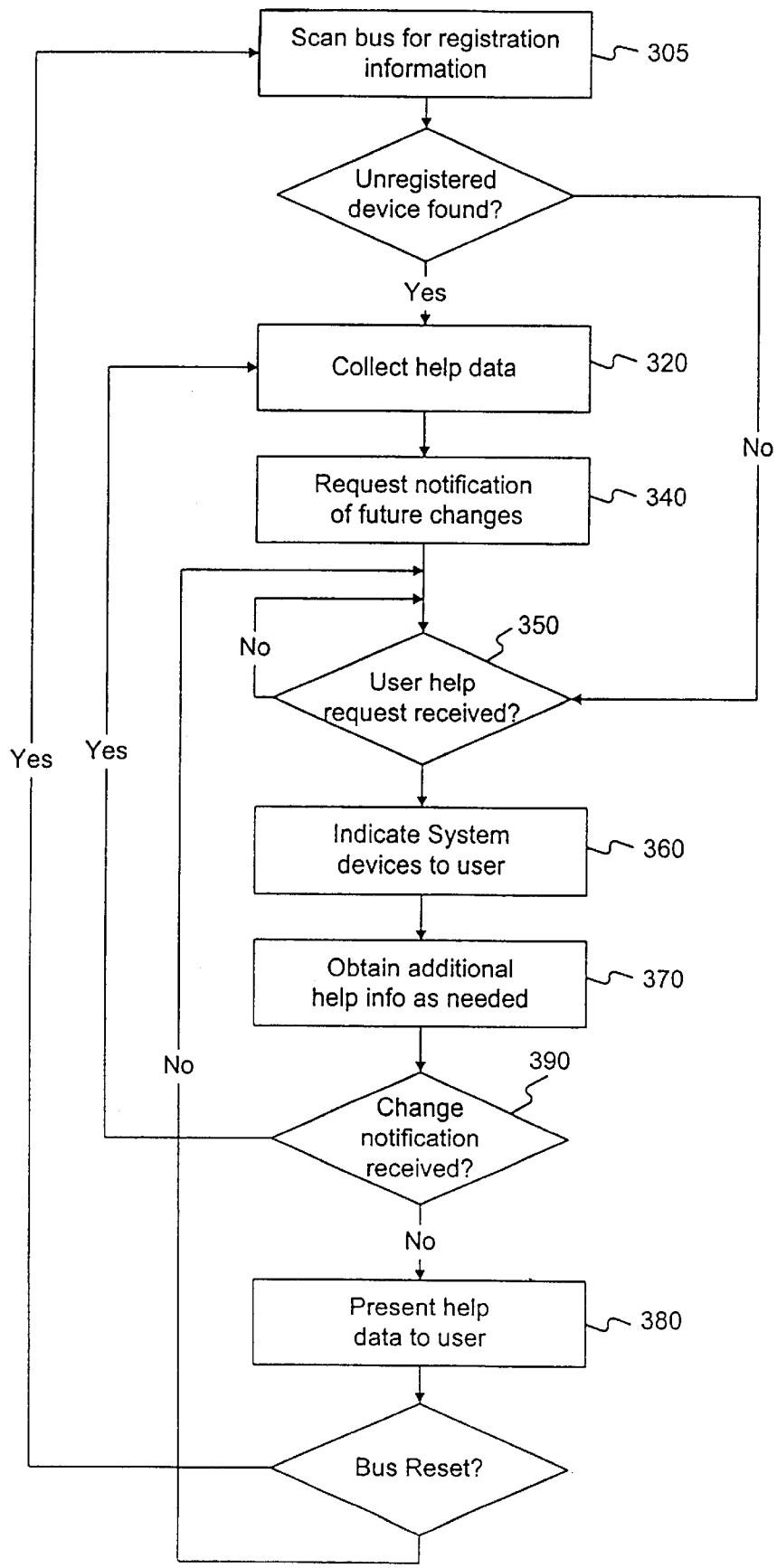
FIG. 3 is a flow diagram of the operation of a help system consistent with the principles of the present invention.

FIG. 3 shows a flow diagram of the operation of a help system consistent with the principles of the present invention. When more than one device on the network includes a help system 120, each help system 120 may operate as set forth below. The help system of the present invention initializes its internal information and registers network devices by scanning the bus to collect help information related to the network devices (stage 305). For each device not currently registered with the help system, the help system collects the help data associated with the device (stage 320). The help system requests that each device send updated help information to it as help information changes (stage 340). Upon receiving a change notification (stage 390) the help system automatically updates its help information (stage 320).

Upon receiving a help request from a user of the help system (stage 350), the help system presents a "main menu" to the user (stage 360). The "main menu" indicates the network devices for which help information may be obtained. A user must specify, by selecting from an input device, from which network device(s) help information is desired. If the help system has not previously received all help information related to a device, the system retrieves any additional help information from the appropriate storage facility (stage 370).

To present the help information to a user, the help system constructs a user interface according to both the type of device for which the help information is being presented (stage 380), and according to the type of device that will present the help information. A help presentation may be adjusted to account for a state of a device or controls being described. For example, an on-screen button for a VCR may be disabled or inactive if there is no tape inserted into the machine. The help system would explain why the button is disabled and instruct a user on how to enable it to perform the requested operation.

Help information may be presented to a user in an interactive or non-interactive manner. For example, presenting a series of text boxes providing configuration or use information about a device is non-interactive. On the other hand, an interactive help presentation may guide the user through a specific sequence of steps necessary for completing an operation.

The help presentation may include audio data, or data in the form of an audio or video track. An audio sound track associated with help data may be accessed by use of an AV/C or HAVi™ data structure that specifies where the audio data may be found and when it should be played (i.e., to correspond to the video display). Similarly, a video sequence illustrating how to perform an instruction stage may be linked to each instruction. The data format for the video could be any compatible standard as defined by any standards body, such as the International Electrotechnical Commission ("IEC") 61883 protocol. An example of a compatible video format is the Motion Pictures Experts Group ("MPEG") standard. Additional information on MPEG may be obtained from the International Telecommunications Union. One skilled in the art will understand that IEC standards are compatible with a variety of video compression and formatting techniques.

The help system may be deactivated by a user request, or upon completion of an operation or the passing of a specified time interval.

The help system of the present invention may also be used to provide multi-device help for network devices. When a user needs to configure two or more devices to use a feature of a device, a multi-device help operation must be performed. For example, when a user performs a recording operation between a CD player and an MD recording deck, by using features of both devices a user may be able to perform the operation in fewer steps.

To perform a multi-device help operation each network device must determine which other devices it may operate with. This can be accomplished by each device scanning the network bus and collecting SDD or AV/C data related to other network devices. When a user invokes operation of the help system and selects a help operation for a specific device, the user is prompted to specify which other devices to use in performing the operation. The help system then determines whether the specified devices may be used together and provides help information accordingly.

CONCLUSION

The system herein described is a generic help utility, portable to a variety of consumer electronic device network configurations. It will therefore be apparent to those skilled in the art that various modifications and variations can be made to the present invention without departing from the scope and spirit of the invention. For example, although the help system has been described as being stored in a network consumer electronic device, it may be stored in a network PC. Similarly, help information associated with a network device may be stored in a help information storage module contained in another network device, or on a network server, in which case, a device would provide a reference to where its help information is stored.

Additionally, although the help system utility was described in the context of a network based on IEEE-1394, other interface architectures, for example, Universal Serial Bus ("USB"), may be used. Alternatively, consumer electronic devices may communicate with one another via infrared data ports, or an equivalent mechanism supporting communications between devices that are not physically connected to one another.

Other embodiments of the invention will also be apparent to those skilled in the art from consideration of the specification and practice of the invention disclosed herein. It is intended that the specification and examples be considered as exemplary only, with the true scope and spirit of the invention being indicated by the appended claims.

What is claimed is:

1. An apparatus for providing help information in a distributed electronic network, comprising:

a help system configured to access said help information corresponding to different types of electronic devices in said distributed electronic network, said help system then providing said help information to a system user in response to a help request, said help information including individual operating instructions and specific configuration information corresponding to said different types of said electronic devices, said help system simultaneously providing multi-device help for utilizing a plurality of said different types of said electronic devices in a single operation; and a processor coupled to one of said electronic devices, said processor being configured to control said help system to thereby provide said help information to said system user.

2. A method for providing help information in a distributed electronic network, comprising the steps of:

utilizing a help system to access said help information corresponding to different types of electronic devices in said distributed electronic network, said help system then providing said help information to a system user in response to a help request, said help information including individual operating instructions and specific configuration information corresponding to said different types of said electronic devices, said help system simultaneously providing multi-device help for utilizing a plurality of said different types of said electronic devices in a single operation; and controlling said help system with a processor coupled to one of said electronic devices to thereby provide said help information to said system user.

3. An apparatus for providing help information in a distributed electronic network, comprising:

a help system configured to access said help information corresponding to different types of electronic devices in said distributed electronic network, said help system then providing said help information to a system user in response to a help request, said help information including individual operating instructions and specific configuration information corresponding to said different types of said electronic devices, said help information including a device type identifier, devices feature specifications, and device compatibily characteristics for said different types of said electronic devices; and a processor coupled to one of said electronic devices, said processor being configured to control said help system to thereby provide said help information to said system user.

4. A method for providing help information in a distributed electronic network, comprising the steps of:

utilizing a help system to access said help information corresponding to different types of electronic devices in said distributed electronic network, said help system then providing said help information to a system user in response to a help request, said help information including individual operating instructions and specific configuration information corresponding to said different types of said electronic devices said help information including a device type identifier, device feature specifications, and device compatibility characteristics for said different types of said electronic devices; and controlling said help system with a processor coupled to one of said electronic devices to thereby provide said help information to said system user.

5. An apparatus for providing help information in a distributed electronic network, comprising:

a help system configured to access said help information corresponding to different types of electronic devices in said distributed electronic network, said help system then providing said help information to a system user in response to a help request, said help information including individual operating instructions and specific configuration information corresponding to said different types of said electronic devices, each of said electronic devices registering with said help system when said each of said electronic devices becomes connected to said distributed electronic network, each of said electronic devices including self-describing data that directs said help system to a remote storage location that stores device-specific versions of said help information, said help system then downloading and locally storing said device-specific versions of said help information from said remote storage location; and a processor coupled to one of said electronic devices, said processor being configured to control said help system to thereby provide said help information to said system user.

6. A method for providing help information in a distributed electronic network, comprising the steps of:

utilizing a help system to access said help information corresponding to different types of electronic devices in said distributed electronic network, said help system then providing said help information to a system user in response to a help request, said help information including individual operating instructions and specific configuration information corresponding to said different types of said electronic devices, each of said electronic devices registering with said help system when said each of said electronic devices becomes connected to said distributed electronic network, each of said electronic devices including self-describing data that directs said help system to a remote storage location that stores device-specific versions of said help information, said help system then downloading and locally storing said device-specific versions of said help information from said remote storage location; and controlling said help system with a processor coupled to one of said electronic devices to thereby provide said help information to said system user.

7. An apparatus for providing help information in a distributed electronic network, comprising:

a help system configured to access said help information corresponding to different types of electronic devices in said distributed electronic network, said help system then providing said help information to a system user in response to a help request, said help information including individual operating instructions and specific configuration information corresponding to said different types of said electronic devices, said help system performing an initialization procedure by scanning a network bus to collect registration information from said electronic devices in said distributed electronic network, said help system downloading and locally storing device-specific versions of said help information from help storage modules on each of said electronic devices, said help system requesting a notification from said each of said electronic devices for any future changes to said device-specific versions of said help information; and a processor coupled to one of said electronic devices, said processor being configured to control said help system to thereby provide said help information to said system user.

8. The apparatus of claim 7, wherein said help system receives said notification and dynamically updates a corresponding one of said device-specific versions of said help information.

9. A method for providing help information in a distributed electronic network, comprising the steps of:

utilizing a help system to access said help information corresponding to different types of electronic devices in said distributed electronic network, said help system then providing said help information to a system user in response to a help request, said help information including individual operating instructions and specific configuration information corresponding to said different types of said electronic devices, said help system performing an initialization procedure by scanning a network bus to collect registration information from said electronic devices in said distributed electronic network, said help system downloading and locally storing device-specific versions of said help information from help storage modules on each of said electronic devices, said help system requesting a notification from said each of said electronic devices for any future changes to said device-specific versions of said help information; and controlling said help system with a processor coupled to one of said electronic devices to thereby provide said help information to said system user.

10. The method of claim 9 wherein said help system receives said notification and dynamically updates a corresponding one of said device-specific versions of said help information.

* * * * *